United States Patent
Danning (10) Patent No.: US 8,656,660 B2
(45) Date of Patent: Feb. 25, 2014

(54) ROOFTOP MODULE INTERLOCK SYSTEM

(75) Inventor: Matthew G. Danning, Oakland, CA (US)

(73) Assignee: SunPower Corporation, San Jose, CA (US)

( * ) Notice: Subject to any disclaimer, the term of this patent is extended or adjusted under 35 U.S.C. 154(b) by 0 days.

(21) Appl. No.: 13/324,991

(22) Filed: Dec. 13, 2011

(65) Prior Publication Data

US 2013/0000229 A1  Jan. 3, 2013

Related U.S. Application Data

(60) Provisional application No. 61/503,936, filed on Jul. 1, 2011.

(51) Int. Cl.
  *E04H 14/00*  (2006.01)
(52) U.S. Cl.
  USPC .......................................... 52/173.3; 52/586.2
(58) Field of Classification Search
  USPC ............. 52/173.1, 173.3, 588.1, 586.2, 589.1
  See application file for complete search history.

(56) References Cited

U.S. PATENT DOCUMENTS

| | | | | |
|---|---|---|---|---|
| 1,755,480 | A * | 4/1930 | Kramer | 404/47 |
| 3,597,874 | A * | 8/1971 | Ogsbury et al. | 446/104 |
| 4,078,328 | A * | 3/1978 | Rayment | 446/102 |
| 4,372,705 | A * | 2/1983 | Atkinson | 405/19 |
| 5,667,326 | A * | 9/1997 | McGaffigan | 403/176 |
| 7,134,805 | B2 * | 11/2006 | Yee | 404/50 |
| 7,487,771 | B1 * | 2/2009 | Eiffert et al. | 126/622 |
| 8,061,091 | B2 * | 11/2011 | Botkin et al. | 52/173.3 |
| 8,109,048 | B2 * | 2/2012 | West et al. | 52/173.3 |
| 8,141,314 | B2 * | 3/2012 | Rosan | 52/589.1 |
| 8,371,076 | B2 * | 2/2013 | Jones et al. | 52/173.3 |
| 2008/0135088 | A1 * | 6/2008 | Corrales | 136/246 |
| 2009/0320905 | A1 * | 12/2009 | Botkin et al. | 136/251 |
| 2010/0263317 | A1 * | 10/2010 | Genova | 52/588.1 |
| 2011/0067340 | A1 * | 3/2011 | Shapiro et al. | 52/578 |
| 2012/0240485 | A1 * | 9/2012 | Amarasinghe | 52/127.1 |
| 2012/0266549 | A1 * | 10/2012 | Rosan | 52/173.1 |

FOREIGN PATENT DOCUMENTS

JP  02101244 A * 4/1990 ............... E04B 2/72

* cited by examiner

*Primary Examiner* — Joshua J Michner
*Assistant Examiner* — Elizabeth A Plummer
(74) *Attorney, Agent, or Firm* — Knobbe Martens Olson & Bear LLP (57) ABSTRACT

An interlocking system for photovoltaic and other roof-mounted panels is disclosed. One use is for a photovoltaic module which comprises a photovoltaic laminate. The laminate has an upper side which faces the sun during normal operation, and a lower side. The module also comprises a base coupled to the lower side of the photovoltaic laminate. The base also has an outer perimeter and comprises a first engagement site and a second engagement site. The first engagement site comprises a first protrusion having a hemispherical surface, an opening extending through the hemispherical surface, and wherein the first protrusion extends in a first direction and the first direction is substantially perpendicular to the outer perimeter. The second engagement site comprises a second protrusion having a cylindrical surface, the protrusion extending in a second direction, and the second direction is substantially perpendicular to the outer perimeter.

16 Claims, 6 Drawing Sheets

ROOFTOP MODULE INTERLOCK SYSTEM

PRIORITY INFORMATION

The present Application claims priority under 35 U.S.C. §120 to U.S. Provisional Patent Application No. 61/503,936, filed Jul. 1, 2011, the entire contents of which is hereby incorporated by reference.

TECHNICAL FIELD

Embodiments of the subject matter described herein relate generally to rooftop solar modules. More particularly, embodiments of the subject matter relate to interlocking mechanisms for rooftop solar modules.

BACKGROUND

Photovoltaic solar modules can be positioned on rooftops of homes or commercial buildings for use in generating electricity. The modules can be placed on flat roofs or tilted roofs. Frequently, however, roofs can have uneven surfaces. Some causes of uneven surfaces are surface features, such as vents or electrical components, as well as undulating surface profiles caused by workmanship defects in construction of the roofs or gradual degradation of roofing materials over time after continual environmental exposure.

When a rooftop with photovoltaic modules experiences windy conditions, the wind can impart an upward force to the modules, causing them to life upwards off the roof. The modules can be coupled together for the purpose of inhibiting this uprising. Coupling the modules together, however, can be challenging for several reasons. First, photovoltaic modules, when positioned on the uneven surface of a roof, are therefore sometimes forced to follow the uneven surface of the roof. Coupling together modules which are angled relative to each other can be difficult. Second, collections of modules coupled together can have perimeter modules and interior modules. In the event that an interior module needs to be reached for maintenance or repair, it can be difficult to handle only the interior module without disassembling the entire collection of modules, including the perimeter modules, to gain access to the particular module.

One way to couple modules together to address some of these challenges is to use a tongue-in-groove system between adjacent modules and bind the perimeter of the entire assembly with cabling. This technique can leave unresolved the challenge of performing maintenance or repair on edge modules without cutting the cabling holding the assembly together, let alone reaching the central or interior modules.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

A photovoltaic module is disclosed. The photovoltaic module comprises a photovoltaic laminate having an upper side which faces the sun during normal operation and a lower side, and a base coupled to the lower side of the photovoltaic laminate, the base having an outer perimeter. The base comprises a first engagement site comprising a first protrusion having a hemispherical surface, the first protrusion having an opening extending through the hemispherical surface, wherein the first protrusion extends in a first direction and the first direction is substantially perpendicular to the outer perimeter, and a second engagement site comprising a second protrusion having a cylindrical surface, the protrusion extending in a second direction, and the second direction is substantially perpendicular to the outer perimeter.

A releasable engagement system for coupling removable photovoltaic modules while permitting vertical variations is disclosed. The releaseable engagement system comprises a first rooftop panel having a cylindrical engagement surface, a second rooftop panel having a hemispherical engagement surface, where the hemispherical engagement surface sized to couple with the cylindrical engagement surface, and a locking clip coupling the hemispherical engagement surface to the cylindrical engagement surface.

A rooftop tile is also disclosed. The rooftop tile comprises a photovoltaic laminate, a foam insulation base supporting the photovoltaic laminate, a first interlocking coupling site on the foam insulation base, the first coupling site comprising a convex surface, and a second interlocking coupling site on the foam insulation base, the second coupling site comprising a concave surface.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIGS. 1-14 depicts exemplary arrangements of elements, additional intervening elements, devices, features, or components may be present in an embodiment of the depicted subject matter.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

Figure 1:
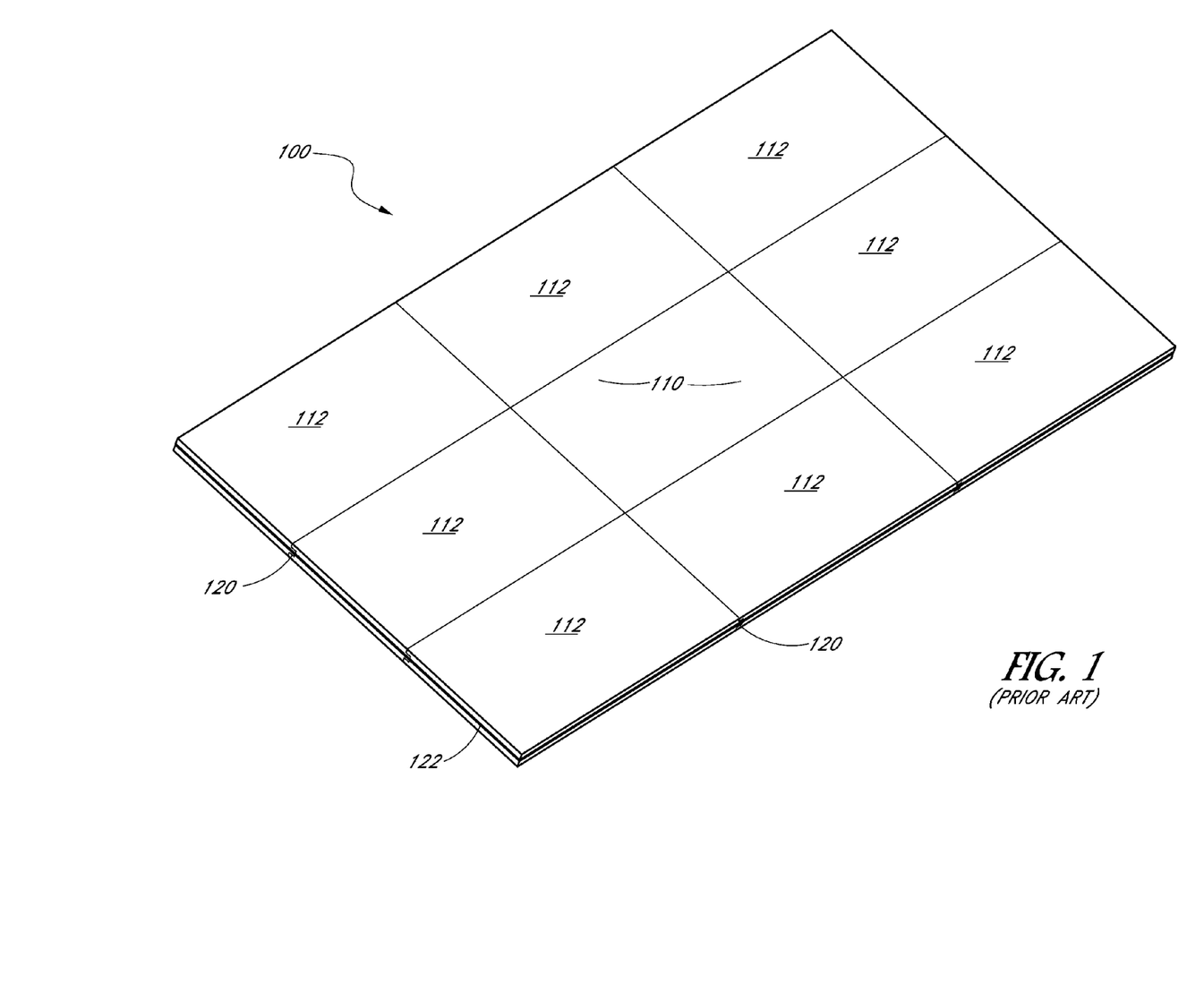
FIG. 1 is a perspective view of a prior art solar installation.

FIG. 1 illustrates a solar installation 100 of the type which is deposited on the roof of a building. The solar installation 100 has a plurality of solar panels 110, 112 divided into interior panels 110 and perimeter panels 112. Although the installation 100 is shown with nine panels, others can have a much greater number of panels.

The solar panels 110, 112 have a tongue-in-groove arrangement visible at seams 120 between the panels 110, 112. The solar panels 110, 112 can be coupled together with the tongue-in-groove feature, combined with a perimeter cable 122. The installation 100, however, will still present challenges related to operations and maintenance, as well as uneven settling on the roof surface caused by topological features of the roof.

A new interlocking releasable arrangement can be used between solar panels to permit conformance with an uneven roof surface, as well as permit simple release and removal from the installation for operation and maintenance.

Figure 2A:
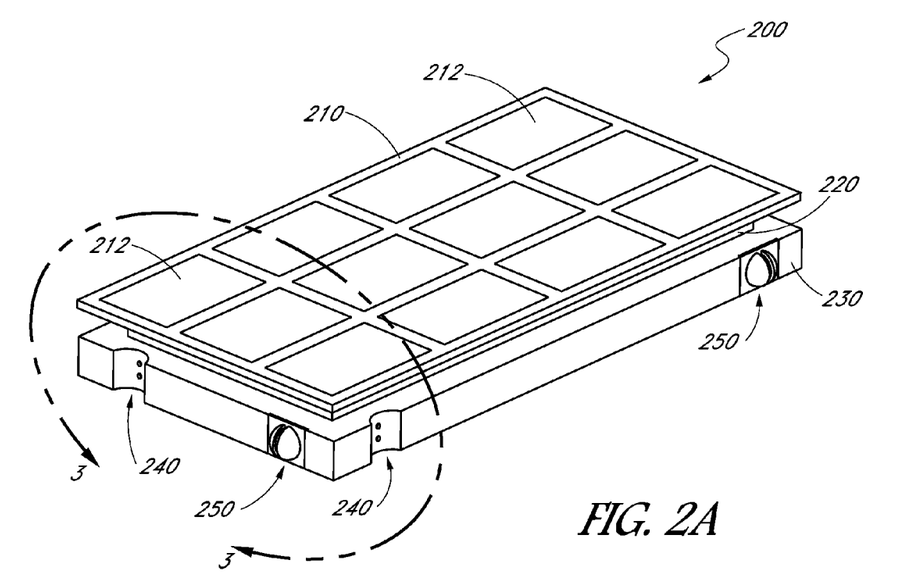
FIG. 2A is a front perspective view of an embodiment an interlocking solar module.
Figure 2B:
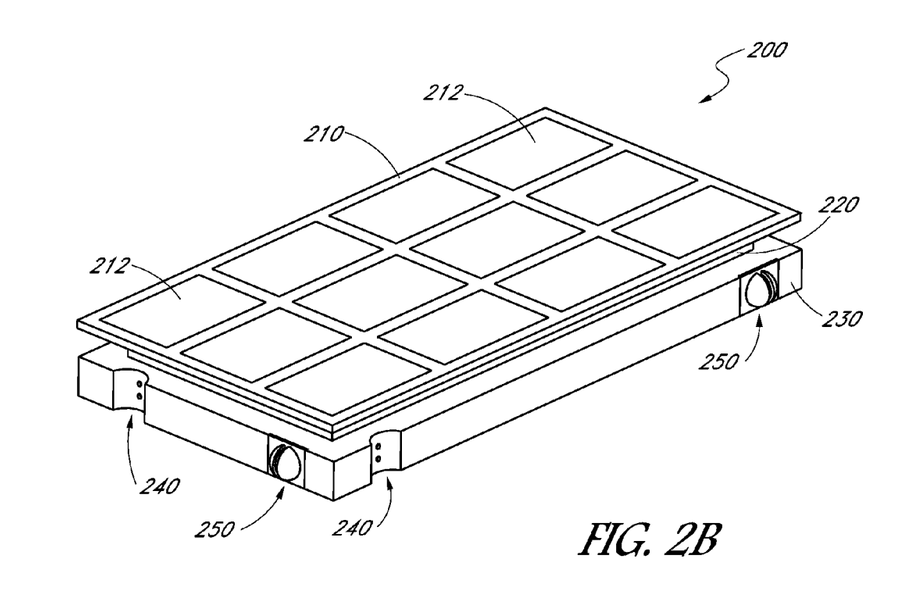
FIG. 2B is a rear perspective view of the embodiment of an interlocking solar module of FIG. 2A.

FIG. 2A illustrates a front perspective view of an embodiment of a photovoltaic solar panel 200. The solar panel 200 comprises a photovoltaic laminate 210, a base 230, and several interlocking coupling sites 240, 250. The base 230 can additionally comprise a platform 220 supporting the photovoltaic laminate 210. FIG. 2B illustrates a rear perspective view of the photovoltaic solar panel 200 embodiment.

The photovoltaic laminate 210 can comprise a plurality of photovoltaic solar cells 212, which can be back-contact solar cells or front-contact solar cells. In certain embodiments, the solar cells 212 can be monocrystalline, while in others they are polycrystalline or thin film cells. The photovoltaic laminate 210 can, in addition to the solar cells 212, comprise an encapsulant surrounding the solar cells 212, a backsheet, a transparent cover, and other features as desired for the embodiment.

The base component, such as, in one embodiment, base 230, of the solar panel 200 is that which rests upon the roof of the building, directly or indirectly contacting it. The base component can support the photovoltaic laminate 210. The base 230 can comprise a foam block or pad, including a Styrofoam or insulation block. The base 230 can provide thermal insulation to the building upon which it rests. The base 230, in certain embodiments, including the illustrated embodiment, can additionally comprise a platform section 220 extending upward from the base 230 and supporting the photovoltaic laminate 210, connecting the two.

The base 230 can comprise several coupling sites 240, 250. The coupling sites 240, 250 can have respective cylindrical and hemispherical surfaces. With additional reference to FIGS. 3-7, the coupling sites 240, 250 are illustrated in detailed views.

Figure 3:
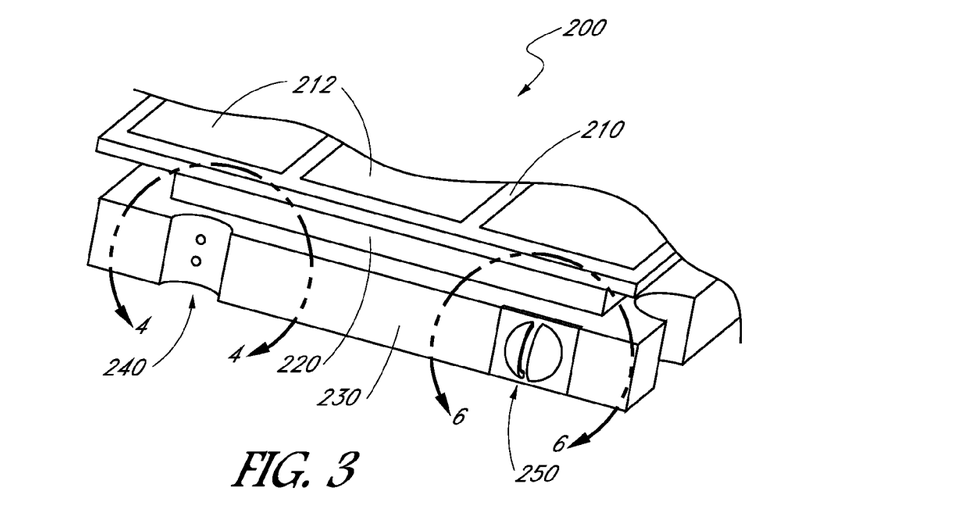
FIG. 3 is a detailed view of a portion of the interlocking solar module of FIG. 2A.

FIG. 3 illustrates a detailed view of one side of the solar panel 200. The cylindrical coupling site 240 and the hemispherical coupling site 250 are both present along the same side of the solar panel 200. Each of the cylindrical and hemispherical coupling sites 240, 250 can be positioned along the sidewall of the base 230, extending along substantially the entirety of the height of the base 230, or only part thereof.

Although the exemplary illustrated solar panel 200 has eight coupling sites 240, 250, four of each type in an alternating arrangement around the perimeter of the base 230, other embodiments can have more or fewer coupling sites, and in different positions than those shown. For example, one embodiment can have a single coupling site on a side, such as only one cylindrical coupling site 240 on one edge of the panel 200 with a hemispherical coupling site 250 positioned in a corresponding position on the opposite edge of the panel. A similar arrangement can be present in a cross-wise direction, resulting in a panel 200 which can be repeated in an interlocking pattern throughout a solar installation made of similar panels 200.

Figure 4:
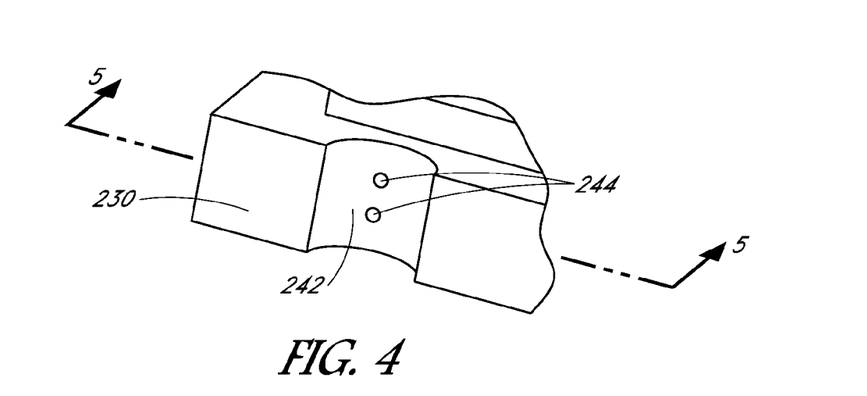
FIG. 4 is a detailed view of a portion of the interlocking solar module of FIG. 3.
Figure 5:
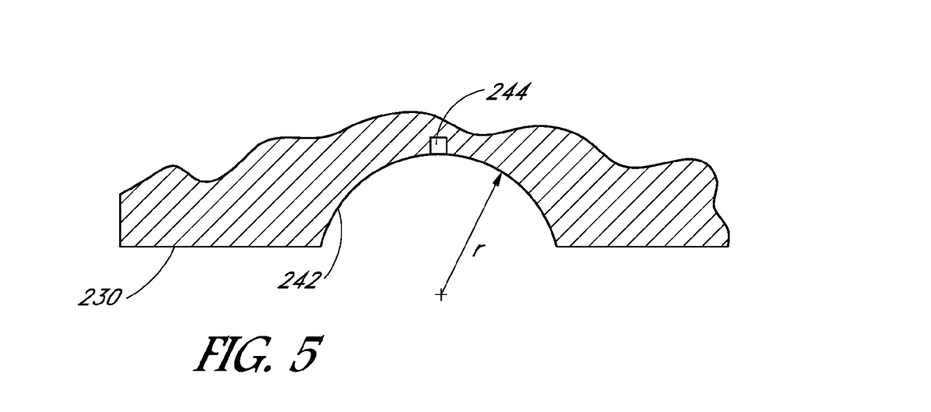
FIG. 5 is a top view of the detailed view of FIG. 4.

FIG. 4 illustrates a detailed view of the cylindrical coupling site 240. FIG. 5 additionally illustrates a detailed top view of the cylindrical coupling site 240. The cylindrical coupling site 240 can have a convex or, as illustrated, concave surface, relative to the surface of the base 230 surrounding it. Although illustrated as having a concave circular cylindrical surface when viewed vertically, other geometrical shapes can be used, such as rounded oval or oblong concave cylindrical shapes, or non-rounded shapes, such as rectilinear concave shapes, including concave shapes having inward squares, pentagons, hexagons, and so on, when viewed vertically.

In some embodiments, the protruding cylindrical surface 242 of the cylindrical coupling site 240 can extend substantially perpendicularly to the edge of the base 230. In certain embodiments, the protruding cylindrical surface 242 can be oriented at an acute or, when considered from the complementary direction, obtuse angle to the side of the base 230 in which it is disposed. In some embodiments, the protruding cylindrical surface 242 can extend at 45° to the sidewall of the base 230. The cylindrical surface 242 can have a radius of curvature r as shown in FIG. 5.

The cylindrical surface 242 can be smooth or textured, as desired for the embodiment. In some embodiments, the cylindrical coupling site 240 can be constructed as an independent component and coupled to the base 230. In other embodiments, the cylindrical coupling site 240 can be formed integrally with the foam or other material component of the base 230. The cylindrical coupling site 240 can additionally comprise one or more clip retention sites 244. The clip retention sites 244 can be rings, holes, ports, or other engagement devices, whether interference fits, affixed, such as by a bonding agent or adhesive, or fastened, such as by a screw, bolt, or other fastening technique.

Figure 6:
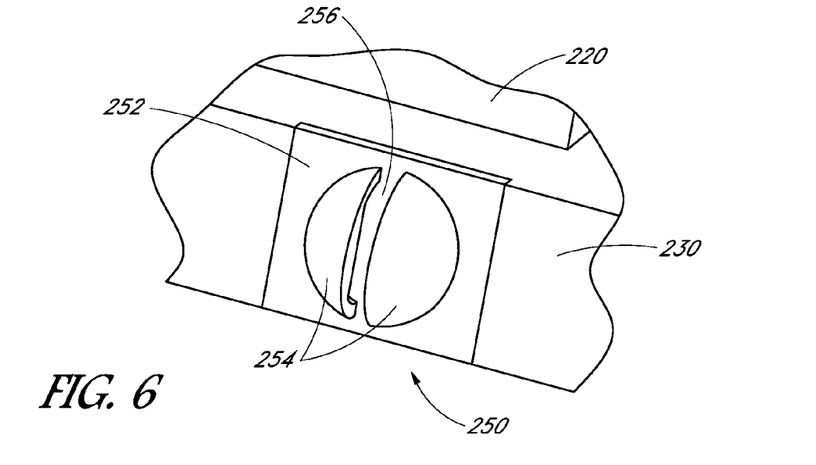
FIG. 6 is a detailed view of a portion of the interlocking solar module of FIG. 3.
Figure 7:
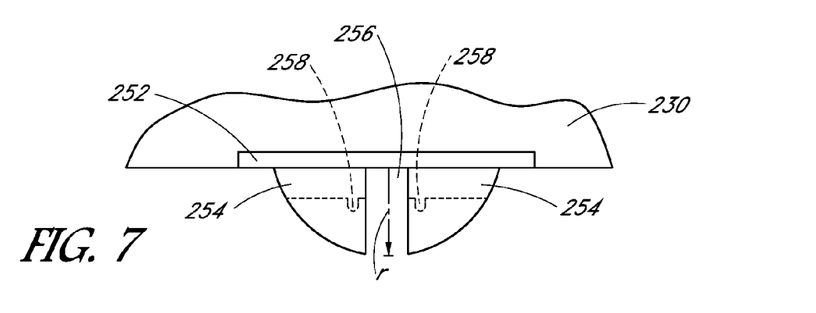
FIG. 7 is a top view of the detailed view of FIG. 6.

FIGS. 6 and 7 illustrate perspective and top views, respectively, of the hemispherical coupling site 250. The hemispherical coupling site 250 can comprise a base plate 252, protruding hemispherical portions 254 with an opening 256 therebetween, and a clip slot 258 behind, or on the rear side of the hemispherical portions 254. The convex, protruding hemispherical portions 254 can have a radius of curvature r. In certain embodiments, the radius of curvature of the hemispherical coupling site or sites 250 can be the same as that of the cylindrical coupling site or sites 240, or as similar as necessary to permit coupling between them.

The hemispherical portions 254 can, in some embodiments, extend in a direction substantially perpendicular to the sidewall of the base 230. The hemispherical portions 254 can have an opening 256 extending between them. In certain embodiments, the opening 256 extends vertically, relative to the building on which the solar module 200 rests. In other embodiments, the opening 256 can extend in different directions, including the horizontal direction. In certain embodiments, the opening 256 can extend across the entire hemispherical face of the protruding surfaces 254. In other embodiments, the opening 256 can be a slot only partially traversing the hemispherical protrusion 254.

The hemispherical protruding surfaces 254 can have a rear engagement location 258, such as a clip, slot, port, or other feature to receive a portion of a clip. The rear engagement location 258 can be single or, as in the illustrated embodiment, two engagement features or locations 258 can be located on either side of and, in certain embodiments, extend parallel to, the opening 256.

The base plate 252 can be coupled to, affixed to, fastened to, or otherwise positioned in the sidewall of the base 230. In certain embodiments, the base plate 252 can itself protrude from the side of the base 230. In some embodiments, the cylindrical and hemispherical coupling sites 240, 250, including the base plate can be constructed of a metal, such as aluminum or steel, including a stainless steel. In other embodiments, a plastic or composite material can be used.

Figure 8:
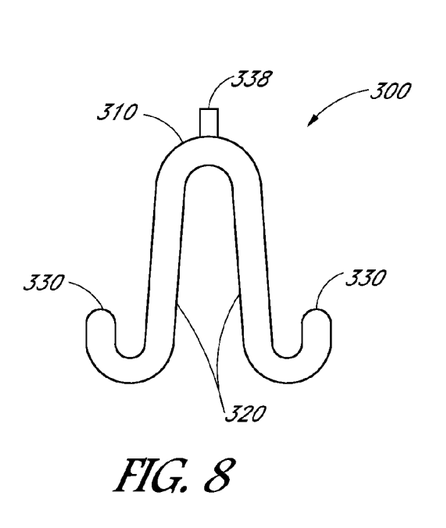
FIG. 8 is a top view of an embodiment of a locking clip.
Figure 9:
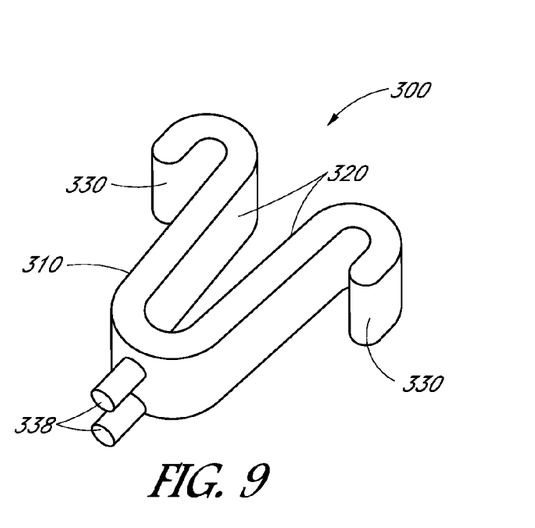
FIG. 9 is a perspective view of the locking clip of FIG. 8.

FIG. 8 illustrates an embodiment of a clip 300 for use in coupling two interlocking coupling sites together. FIG. 9 illustrates a top view of the clip 300. The clip 300 can be any shape desired for an embodiment. Thus, although one exemplary clip 300 is illustrated in FIGS. 8 and 9, other embodiments can have different shapes without deviating from the concepts described herein.

The clip 300 can have a body portion 310 with several biasing members 320. The biasing members 320 can terminate in hooked, return, or curved portions 330. In some embodiments, including the illustrated embodiment, the curved portions 330 can be oriented back toward the body portion 310 from the end(s) of the biasing members 320.

The biasing members 320 can be spring-like members which elastically deform when compressed. In certain embodiments, the biasing members 320 can have an undeflected or undeformed shape to which they return in the absence of a forced exerted upon one or both.

The clip 300 can be constructed of an elastic metal material, including steels, aluminum, and so forth. In some embodiments, the clip 300 can be constructed of a plastic or polymer, or even a ceramic or composite material. The clip 300 can also be composed of a shape memory allow. The clip 300 can be sized appropriately for use in interlocking two coupling sites.

The clip 300 can additionally have one or more engagement members 338 for coupling to the clip retention sites 244. In certain embodiments, the clip 300 can be disengaged from the clip retention sites 244 manually, while in others, a tool can be used to separate the clip 300 from the cylindrical surface 242 at the clip retention sites 244. Additionally, although shown in a post/hole arrangement, other configurations can be used to couple the clip 300 to the cylindrical coupling site 240, including fasteners, adhesives, including releaseable or reusable adhesives, interference fit designs, and so on. The clip 300 can be used to couple adjacent solar panels together by releasably engaging and thereby coupling neighboring cylindrical and hemispherical coupling sites as shown.

Figure 10:
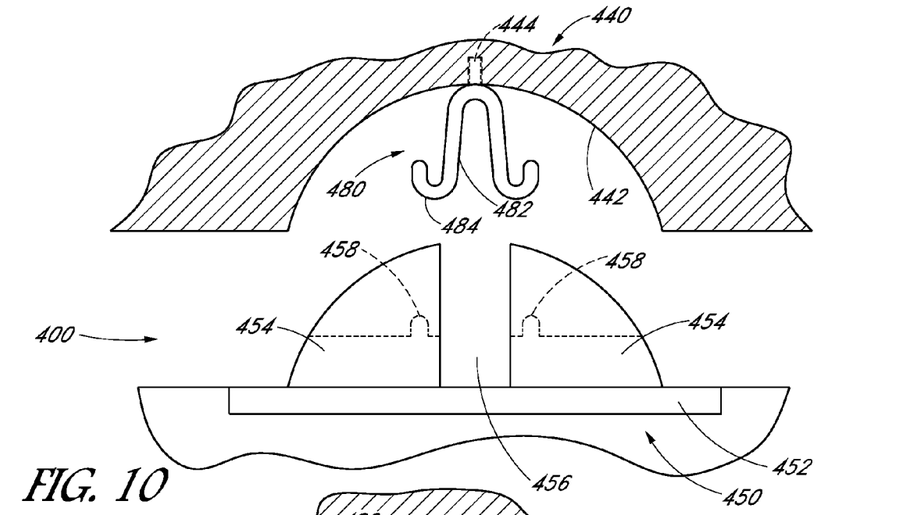
FIG. 10 is top view of an embodiment of a releasable engagement system in a disengaged arrangement.
Figure 11:
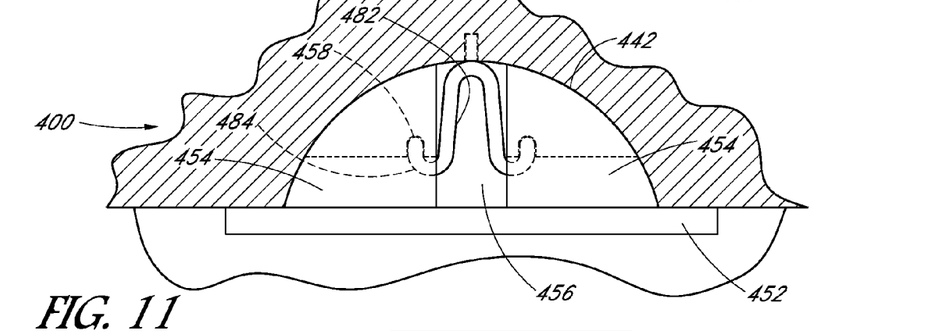
FIG. 11 is a top view of the releasable engagement system of FIG. 10 in an engaged arrangement.
Figure 12:
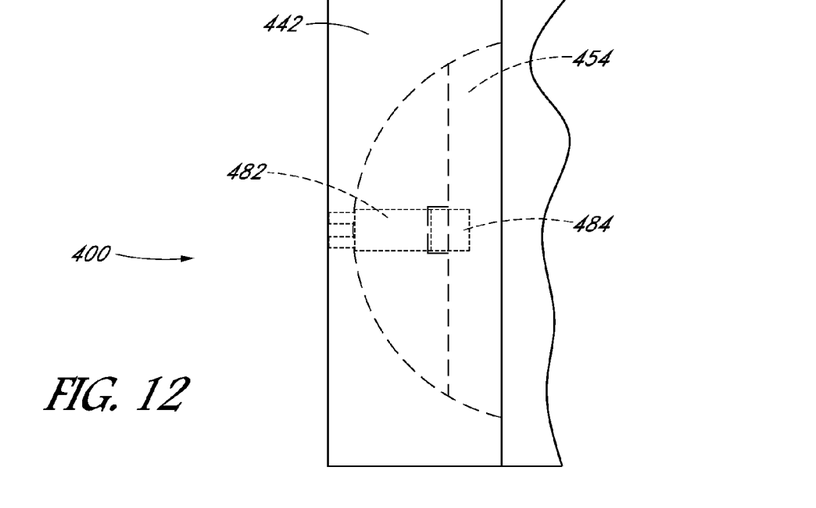
FIG. 12 is a side view of the releasable engagement system of FIG. 11 in the engaged arrangement.

FIG. 10 illustrates a coupling system 400. The coupling system 400 comprises components designated by numerical indicators which, unless otherwise indicated, refer to similar components or features of those described above, except that the numerical indicators have been incremented by 200. FIG. 10 illustrates a top view of the coupling system 400, wherein the cylindrical and hemispherical coupling sites 440, 450 are positioned adjacent one another, but not yet engaged. FIG. 11 illustrates the coupling system 400 of FIG. 10 in an engaged and coupled state. FIG. 12 illustrates a side view of the coupling system 400.

Clip 480 is illustrated engaged with the clip retention sites 444. In some embodiments, a single retention site 444 is used for coupling the clip 480 to the protruding cylindrical surface 442. Clip 480 has components and features similar to those described with respect to FIGS. 8 and 9.

As can be seen, the hemispherical coupling site 450 can be positioned adjacent a cylindrical coupling site 440, oriented such that the protruding hemispherical surfaces 454 are aligned to be received by the concave side of the cylindrical surface 442. The cylindrical and hemispherical coupling sites 440, 450 can thus be appropriately sized to interlock.

As shown in FIG. 11, once positioned in contact with one another, the clip 480 can extend from the retention site(s) 444 of the cylindrical coupling site 440 through the opening 456. The curved portions 484 of the clip 480 can be positioned to extend toward the cylindrical surface 442, and engage the rear engagement locations 458 on either side of the opening 456. The biasing members 482 of the clip 480 can be adapted to position the curved portions 484 in or coupled to the rear engagement locations 458 when in an undeformed state. The biasing members 482 can, however, be constructed such that a force can be applied inwardly to the biasing members 482 will withdraw the curved portions 484 from coupling with the rear engagement locations 458 and position them in the opening 456, thereby permitting the disengagement and/or decoupling of the cylindrical and hemispherical coupling sites 440, 450, if desired. Manipulation of the biasing members 482 can be accomplished by a tool or manual interaction, as desired for the embodiment. In some embodiments, the rear engagement locations 458 can have a vertical size slightly in excess of the vertical size of the clip curve features.

When the cylindrical and hemispherical coupling sites 440, 450 are engaged as shown in FIG. 11, the clip 480 inhibits separation by translation of the sites 440, 450. Because of the corresponding curved cylindrical and hemispherical surfaces 442, 454, however, the coupling sites 440, 450 can rotate along the hemispherical surface 454 without decoupling from the cylindrical surface 442. Such permitted rotation can enable adjacent solar panels coupled using the coupling sites 440, 450 to be oriented at an angle to each other. The enabled angular orientation can permit a solar installation composed of solar panels releasably interlocked by a coupling system, such as coupling system 400, to accommodate uneven roofing surfaces without straining a connection between the solar panels. Additionally, because the hemispherical surfaces 454 can be translated vertically along the cylindrical surface 442 after the clip 480 is removed, a solar panel can be vertically removed from the installation without requiring the removal of adjacent solar panels, thereby facilitating maintenance and repair. A new, or repaired version of the solar panel, can be introduced into the void in the installation by permitting it to descend vertically into place. The clip 480 can be re-engaged between the coupling sites 440, 450, releasably coupling the new solar panel into the installation.

Figure 13:
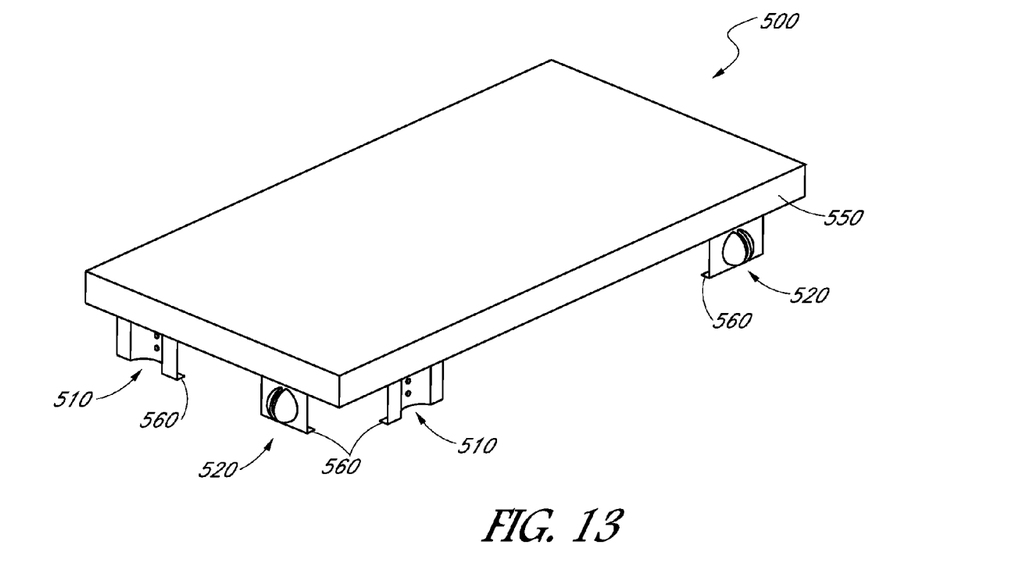
FIG. 13 is a perspective view of an embodiment of a photovoltaic module with a releasable engagement system.
Figure 14:
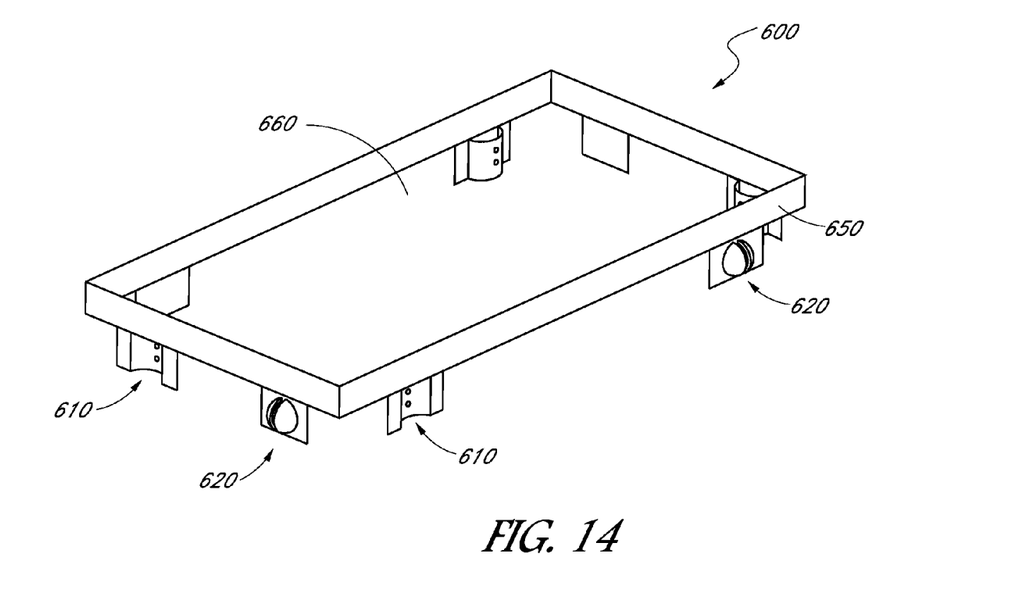
FIG. 14 is a perspective view of another embodiment of a photovoltaic module with a releasable engagement system.

FIGS. 13 and 14 illustrate embodiments of a solar panel 500, 600 incorporating embodiments of the coupling system 400.

FIG. 13 illustrates an exemplary embodiment of a solar panel 500 wherein cylindrical coupling sites 510 and hemispherical coupling sites 520 are not formed coplanar with the base 550, but instead extend downward from it. The coupling sites 510, 520 can directly contact the roof, supporting solar panel 500, and can have a flange or base portion, such as foot 560 illustrated.

FIG. 14 illustrates another embodiment of the interlocking system, wherein the coupling sites are be formed extending from a perimeter frame 650 with a space 660 to receive, surrounding, and/or support a photovoltaic laminate, such as laminate 210, without the use of a base 230. A perimeter frame, such as illustrated frame 650, can be constructed to surround and support a photovoltaic laminate, whereby cylindrical and hemispherical coupling sites 610, 620 can releasably interconnect the perimeter frame 650 to adjacent, similarly-constructed perimeter frames, permitting construction of a solar installation of such frames. In those embodiments where the cylindrical and hemispherical coupling sites 610, 620 are formed as part of a frame, they can be integrally formed with the frame of whatever material is selected for the frame. Certain of such embodiments can omit components, including, for example, a base plate.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A photovoltaic module comprising:
   a photovoltaic laminate having an upper side which faces the sun during normal operation, and a lower side; and
   a base coupled to the lower side of the photovoltaic laminate, the base having an outer perimeter and the base comprising:
   a first engagement site comprising a first protrusion having a hemispherical surface, the first protrusion having an opening extending through the hemispherical surface, wherein the first protrusion extends in a first direction and the first direction is substantially perpendicular to the outer perimeter; and
   a second engagement site comprising a second protrusion having a cylindrical surface, the protrusion extending in a second direction, and the second direction is substantially perpendicular to the outer perimeter; and
   wherein the first protrusion comprises two portions with the opening disposed therebetween, and
   wherein the first protrusion comprises a rear engagement feature on a rear side of the hemispherical surface.

2. The photovoltaic module of claim 1, wherein the cylindrical surface extends perpendicularly to the second direction.

3. The photovoltaic module of claim 1, wherein the first hemispherical surface is sized to correspond to the cylindrical surface.

4. The photovoltaic module of claim 1, wherein the second protrusion has a hole extending through the cylindrical surface.

5. The photovoltaic module of claim 1, wherein the first direction is away from the lower side of the photovoltaic laminate.

6. The photovoltaic module of claim 5, wherein the second direction extends toward the lower side of the photovoltaic laminate.

7. The photovoltaic module of claim 1, wherein the hemispherical surface and cylindrical surface have the same radius of curvature.

8. The photovoltaic module of claim 1, wherein the opening extends in a direction perpendicular to the first direction.

9. The photovoltaic module of claim 1, wherein the hemispherical surface is convex.

10. The photovoltaic module of claim 9, wherein the cylindrical surface is concave.

11. The photovoltaic module of claim 1, wherein the base comprises foam.

12. The photovoltaic module of claim 1, wherein the first protrusion and the second protrusion are disposed along the same side of the outer perimeter of the base.

13. The photovoltaic module of claim 12, wherein the first protrusion is adapted to couple to a third protrusion of an adjacent photovoltaic module, and wherein the second protrusion is adapted to couple to a fourth protrusion of the adjacent photovoltaic module, wherein the first protrusion and the fourth protrusion are substantially the same, and wherein the second protrusion and the third protrusion are substantially the same.

14. The photovoltaic module of claim 1, wherein the rear engagement feature comprises a slot on a rear side of the hemispherical surface, the slot sized and shaped to receive a portion of a clip.

15. The photovoltaic module of claim 14, further comprising the clip, the clip having an engagement member configured to couple to a hole extending through the cylindrical surface of the second protrusion.

16. The photovoltaic module of claim 14, further comprising the clip, the clip comprising a biasing member, the biasing member having a curved portion configured to engage the slot on the rear side of the hemispherical surface.

* * * * *